United States Patent [19]

Mayer et al.

[11] Patent Number: 5,539,809
[45] Date of Patent: Jul. 23, 1996

[54] LOCATION SPECIFIC MESSAGING IN A TELECOMMUNICATIONS NETWORK

[75] Inventors: Daniel J. Mayer, Livingston; Carol A. Wegrzynowicz, Holmdel, both of N.J.

[73] Assignee: AT&T Corp., Murray Hill, N.J.

[21] Appl. No.: 502,268

[22] Filed: Jul. 13, 1995

Related U.S. Application Data

[63] Continuation of Ser. No. 993,888, Dec. 23, 1992, abandoned.

[51] Int. Cl.⁶ .................................................. H04M 3/42
[52] U.S. Cl. .................................. 379/67; 379/71; 379/84; 379/88; 379/201
[58] Field of Search ............................. 379/67, 71, 84, 379/88, 89, 201

[56] References Cited

U.S. PATENT DOCUMENTS

| | | | |
|---|---|---|---|
| 3,544,729 | 12/1970 | Stevens | 379/67 |
| 4,357,493 | 11/1982 | Anderson et al. | 379/72 |
| 4,389,546 | 6/1983 | Glisson et al. | 379/76 X |
| 4,446,337 | 5/1984 | Cofer | 379/213 X |
| 4,547,630 | 10/1985 | Giammarrusco | 379/89 |
| 4,608,460 | 8/1986 | Carter et al. | 379/71 |
| 4,669,891 | 6/1987 | Rosevear | 368/21 |
| 4,811,382 | 3/1989 | Sleevi | 379/202 |
| 4,850,007 | 7/1989 | Marino et al. | 379/67 |
| 4,887,251 | 12/1989 | Takada | 368/21 |
| 5,056,134 | 10/1991 | Baur et al. | 379/88 |
| 5,150,399 | 9/1992 | Yasuda | 379/67 |

FOREIGN PATENT DOCUMENTS

| | | | |
|---|---|---|---|
| 60-51357 | 3/1985 | Japan | 379/71 |

Primary Examiner—Jeffery Hofsass
Assistant Examiner—Daniel S. Hunter
Attorney, Agent, or Firm—Steven M. Gurey; Eugene S. Indyk

[57] ABSTRACT

When one party places a long distance call to another party through a telephone network, there is a delay in completing the call after the calling party enters the telephone number of the called party. During this holding time, a message specific to the geographic location of the called party is synthesized in light of information gleaned from the dialed telephone number and delivered to the calling party. The message may include an identification of the location of the called party, the time of day and date where the called party is located, news, weather, or other location specific information. The message may also include advertising information.

17 Claims, 2 Drawing Sheets

LOCATION SPECIFIC MESSAGING IN A TELECOMMUNICATIONS NETWORK

This application is a continuation of application Ser. No. 07/993,888, filed on Dec. 23, 1992, now abandoned.

TECHNICAL FIELD

This invention relates to messages produced by a telecommunications network. More particularly, this invention relates to messages produced by a telecommunications network giving a calling party information about the called party.

BACKGROUND

When a calling party makes a long distance telephone call to a called party through a telecommunications network, the calling party is subject to a relatively long holding time while the communications network is completing a connection to the called party. During this holding time, the calling party must not only bide time but also may be subjected to a variety of unpleasant sound effects produced by the telecommunications network in the course of completing the connection to the called party.

SUMMARY

Applicants have found that this holding interval can advantageously be used to supply the caller with a variety of useful informational announcements. This significantly enhances the value of services provided by a telephone company and alleviates the disadvantages of the holding times associated with completing long distance telephone calls. In one example of the invention, a caller can be given an audio message identifying the geographical location of the called party and the time of day at that geographical location. In this example, a telephone number of a called party is received from a calling party by the telephone network, which then sets up a call between the calling party and the called party. A predetermined characteristic of the received telephone number is detected in the telephone network and an audio message identifying the geographical location of the called party and the time of day at that location is played to the calling party while the connection is being set up between parties. Instead of playing a message identifying geographical location and time of day, other messages may be played to the calling party during call set up in response to the nature of the called party telephone number.

DETAILED DESCRIPTION

Figure 1:
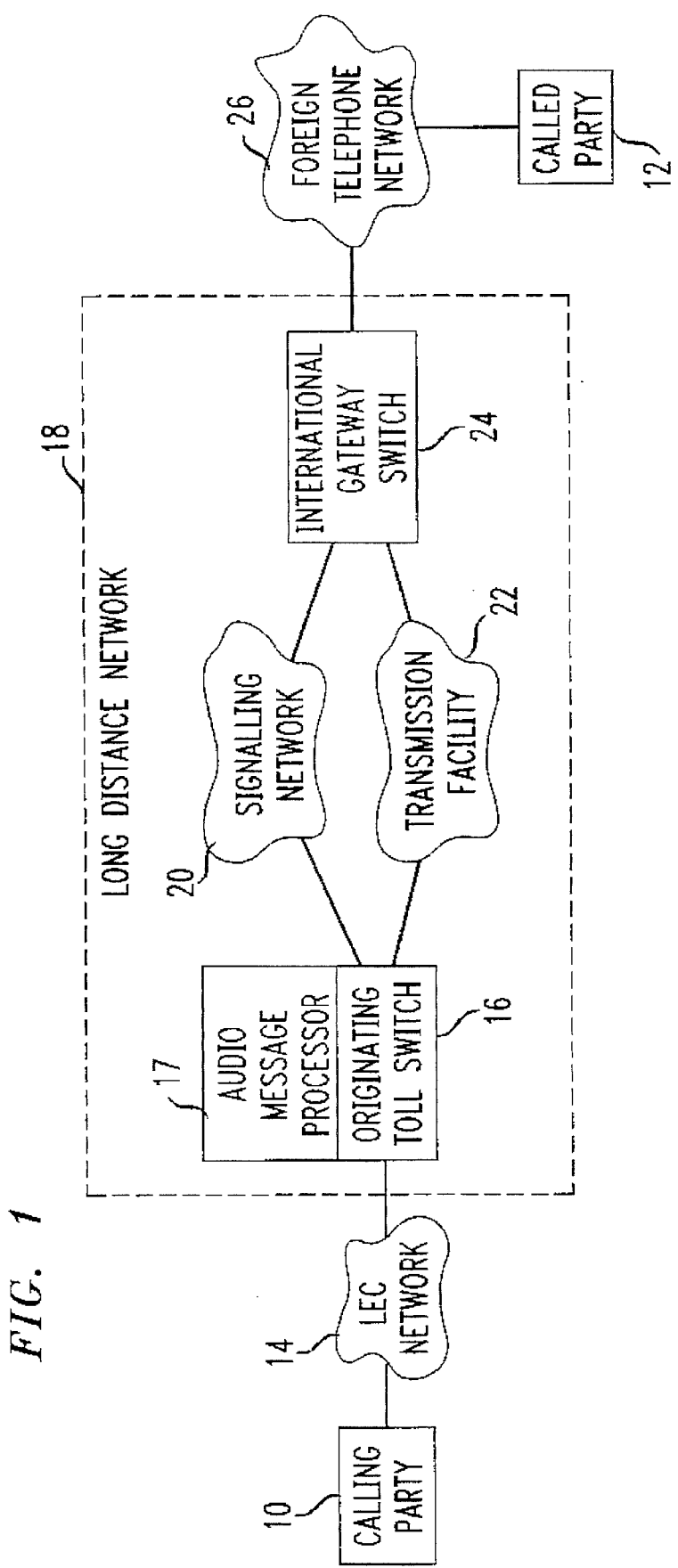
FIG. 1 is a block diagram showing an example of a telephone network in accordance with this invention which is in the process of effectuating an illustrative international telephone call from a calling party to a called party.

FIG. 1 shows an example of the invention involving an illustrative international telephone call made by a calling party 10 to a called party 12. The telephone call is made through an illustrative telephone network comprising a local telephone network 14 provided by a local exchange carrier (LEC), such as one of the regional Bell Operating Companies (RBOCs). The network 14 connects the calling party 10 to an originating toll switch 16 located in a long distance network 18 provided by an interexchange carrier such as AT&T. In addition to the toll switch 16, the long distance network 18 comprises a signaling network 20 which receives the telephone number of the called party 12 from the calling party 10 and creates an appropriate connection between parties 10 and 12 through the appropriate transmission facilities 22 in the long distance network 18. An international phone call made by the calling party 10 is directed to an international gateway switch 24 and then through a foreign telephone network 26 to the called party 12. Although these are not shown in FIG. 1, the networks 14 and 26 may have respective signaling networks which cream a path through appropriate transmission facilities to effectuate their respective parts of the connection between the parties 10 and 12.

The calling party 10 initiates an international telephone call by dialing the telephone number of the called party 12. In this example of the invention, the calling party 10 first dials a series of digits, such as "011", signifying that the telephone call is an international telephone call. The calling party 10 next dials a series of digits representing first a country code and then a city code. One or both of these codes can be used to identify the geographical location of the called party 12 and create an appropriate audio message to be played to the calling party 10 in accordance with this invention. The calling party 10 finally dials a series of digits, uniquely identifying the called party 12, after the international call designation, country code, and city code have been dialed. In response to the calling party 10 dialing the telephone number of the called party 12, the telephone network shown in FIG. 1 sets up a connection between the calling party 10 and the called party 12 to effectuate a telephone call between those two parties. As mentioned above, there is a significant amount of holding time to which the calling party is subjected between entry of the telephone number into the telephone network and the time the call to the called party is completed through the network. During this holding time, for example, during the time between the point at which either the country code or both the city and country codes have been dialed and the point at which tinging of the called party 12 is begun, a message specific to the geographical location of the called party 12 may be played to the calling party 10. In this regard, there is an audio message processor 17, associated with the originating toll switch 16 in this example of the invention, which sends these location specific messages to the calling party 10 during the holding time prior to the completion of the call set-up to the called party 12. As described in more detail below, the audio message processor 17 is responsive to one or both of the country code and the city code dialed by the calling party 10 to create a message given to the calling party 10 which gives some information related to the geographical location of the called party 12. That information may include the identity of the geographical location, the time of day in that geographical location, the date in that location, news about that location, or the weather in that location.

Figure 2:
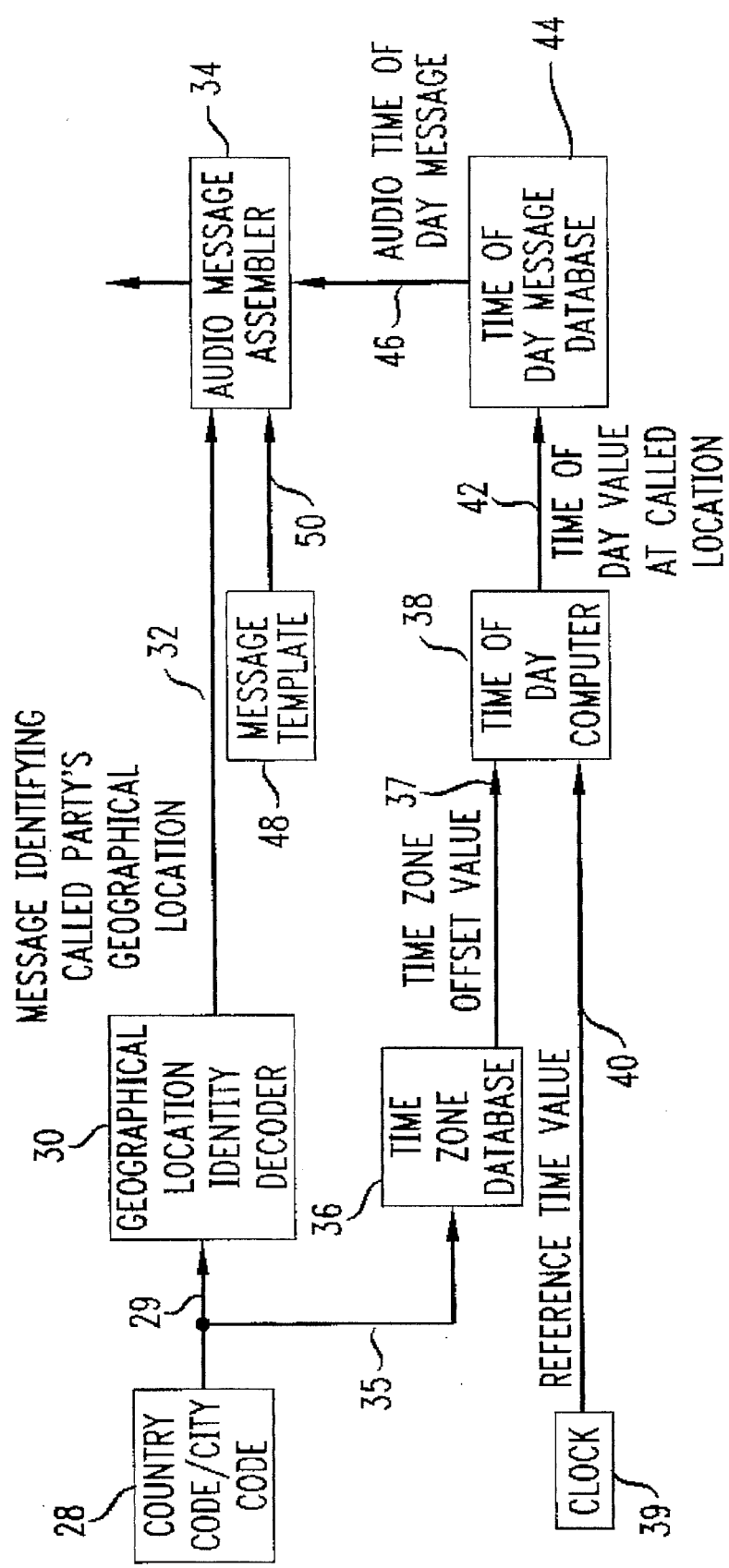
FIG. 2 is a block diagram illustrating the details of the audio message processing in the telephone network of FIG. 1.

FIG. 2 is a block diagram illustrating an example of an audio message processor 17 which plays a message identifying the geographical location being called and the time of day in that location. Particular advantages of playing such a message to a calling party 10 include allowing the calling party 10 to abort the phone call prior to incurring charges for the phone call in cases where the calling party has dialed the wrong location or number or is calling at an inopportune time in the location of the called party 12. This will not only save money for the calling party 10 but will also reduce the number of times that a telephone company will have to deal with requests for refunds for inappropriately made telephone calls.

When the calling party 10 dials the international number of the called party 12, one or both of the country code and city code is caused by the switch 16 to be stored in a register 28 shown in FIG. 2. The content of the register 28 is sent on a line 29 to a decoder 30 which translates one or both of the country code and city code into a digital representation of an audio message block. The message block on line 29 identifies the called party's geographical location and is directed on a line 32 to the input of a message assembler 34. When the call is directed to a country or other geographical location having only a single time zone, then only the country code or equivalent part of the called party's telephone number needs to be translated. When the call is directed to a country or other geographical location having multiple time zones, then both the country code and the city code or their equivalents must be translated. The content of the register 28 is also communicated on a line 35 to a time zone data base 36 which contains a collection of time zone offset values, one value for each time zone around the world. The content of the register 28 addresses the database 36 which then outputs a time zone offset value on line 37 which is directed to a time of day computer 38. The time zone offset value produced on line 37 is specific to the geographical location of the called party 12. A clock 39 produces a reference time value on line 40 which is also input to the time of day computer 38. The clock 39 may produce a reference time value which may represent any reference time, such as local time at the switch 16, Greenwich Mean Time, or other convenient time kept by the network or obtained from outside sources. The offset values stored in the time zone database 36 are values which may be added to or subtracted from the reference time values obtained from clock 39 to produce an accurate digital representation of the local time at the location of the called party 12. In this regard, the time of day computer 38 adds or subtracts the time zone offset value on line 37 to or from the reference time value on line 40 to produce a representation of the time of day at the called location on line 42. The value on line 42 is used to address a time of day message database 44 which contains a group of digital representations of audio messages which communicate the time of day in each of the geographical locations which might be called by the calling party 10. The database produces a representation of the time of day at the geographical location of the called party 12 which is sent on line 46 to the audio message assembler 34.

The clock 39, time zone data base 36, and time of day computer 38 may also be configured so that a message block representing the date in the called location is also produced on line 46 and placed in an appropriate place in the message sent to the caller. This may be useful in situations where a caller is trying to place a call to a location where not only is there a time difference but also a difference in the date. The date may be automatically given for all calls or may be selectively given for only some calls. To accomplish this, the computer 38 or other suitable system may be configured to detect when the date at the caller's location differs from the date at the called location. This difference in dates can be determined in light of local time and date information obtained from the clock 39 and the time offset value obtained from the database 36.

A message template is stored in a register 48 and is sent on a line 50 to an input of the message assembler 34. The message template comprises the part of the message which is common to all calling parties regardless of where the called party is located. For example, the message template stored in register 48 may be as follows: "Thank you for using AT&T to call ———; the local time is ———." (As is apparent from the text of the message template printed above, the message played to the caller provides an opportunity for the telephone company to provide advertising about itself and other businesses.) The audio message assembler 34 adds the message block identifying the geographical location of the called party 12 appearing on line 32 into the first blank in the illustrative message template identified above. The assembler 34 also adds the message block identifying the time of day in the location of the called party 12 appearing on line 46 into the second blank in the template appearing on line 50. If a message block representing the date in the called location is available on line 46, it may also be placed into the first blank space in the template. An example of commercially available circuitry which may perform the message processing functionality is an AT&T Conversant Voice Information System or the like programmed or configured to effectuate the functionality illustrated in FIGS. 1 and 2 or equivalent functionality.

That which is described above is merely an example of a system which plays location specific messages to a calling party during the holding time associated with the completion of a long distance telephone call. In other examples, the country code and city code may be detected and location specific message blocks may be added to an appropriate message template to create messages which give the calling party information such as news and weather in the location of the called party while he or she awaits completion of the telephone call. Other examples of messages which might be played to a calling party include commercial advertising material.

Although FIG. 1 shows the audio message processor 17 associated with an originating toll switch 16 in a long distance network 18, the message processor 17 may be associated with any appropriate network element between the calling party 10 and the called party 12. For example, the audio message processor may be located in the local telephone network 14, in the foreign telephone network 26, or at a different network element in the long distance network such as the international gateway switch 24. In all cases, the audio message processor may be a separate hardware element connected to an existing network element or it may be an integral part of an existing network element such as software loaded into an existing switching system such as the toll switch 16 or the gateway switch 24. A suitable provisioning system should be provided in a appropriate part of a network where a message processor 17 is located so that the messages produced by the processor 17 may be kept accurate and current, particularly in the cases involving rapidly changing information such as news or weather announcements.

Although an example of the invention involving an international telephone call is been shown in FIGS. 1 and 2, the invention is equally applicable to long distance and local domestic telephone calls involving a sufficiently long holding time. In this situation, the character of the area code and exchange digits in the called party's telephone number may be analyzed to produce appropriate location specific message blocks for inclusion into a message template. This assembled message may then be played to a calling party during the call holding time.

We claim:

1. A method of aborting a telephone call placed by a calling party to a called party before a connection is completed to the called party, the method comprising the steps of:

receiving a telephone number of a called party from a calling party;

setting up a call on a telecommunications network in response to the received telephone number by initiating the establishment of the connection between the calling party and the called party;

sending a message to the calling party from the telecommunications network while the connection is being established, the message having an information content indicating the time of day at the location of the called party;

receiving a signal from the calling party before the connection is made to prevent the connection from being established in response to the time of day at the location of the called party sent in the message to the calling party.

2. The method claim 1, in which the message has an information content further indicating the geographical location of the called party.

3. The method of claim 1 in which the message has an information content further indicating the date at the location of the called party.

4. The method of claim 1, in which the sending step comprises the step of detecting at least a portion of the received telephone number and selecting a message to be sent to the calling party in response to the detecting step.

5. The method of claim 4, in which the detecting step comprises the step of detecting a country code in the telephone number.

6. The method of claim 4, in which the detecting step comprises the step of detecting a city code in the telephone number.

7. The method of claim 4, in which the detecting step comprises the step of detecting a country code and a city code in the telephone number.

8. The method of claim 1, in which the telephone call is an international telephone call.

9. A method of aborting an improperly dialed telephone call placed by a calling party to a called party before a connection is established to the called party, the method comprising the steps of:

receiving a telephone number of a called party from a calling party;

setting up a call on a telecommunications network in response to the received telephone number by initiating the establishment of the connection between the calling party and the called party;

sending a message to the calling party from the telecommunications network while the connection is being established, the message having an information content indicating the geographical location of the called party;

receiving a signal from the calling party before the connection is made to prevent the connection from being established if the geographical location of the called party sent to the calling party in the message is not a geographical location that corresponds to geographical location associated with the called party to which the calling party intended to call.

10. The method of claim 9, in which the message further includes a time parameter associated with the location of the called party.

11. The method of claim 10, in which the time parameter comprises the time of day at the location of the called party.

12. The method of claim 10, in which the time parameter comprises the date at the location of the called party.

13. The method of claim 9, in which the sending step comprises the step of detecting at least a portion of the received telephone number and selecting a message to be sent to the calling party in response to the detecting step.

14. The method of claim 13, in which the detecting step comprises the step of detecting a country code in the telephone number.

15. The method of claim 13, in which the detecting step comprises the step of detecting a city code in the telephone number.

16. The method of claim 13, in which the detecting step comprises the step of detecting a country code and a city code in the telephone number.

17. The method of claim 9, in which the telephone call is an international telephone call.

\* \* \* \* \*